United States Patent
Begum et al.

[11] Patent Number: 6,012,244
[45] Date of Patent: Jan. 11, 2000

[54] TRIGGER UNIT FOR SHOPPING CART DISPLAY

[75] Inventors: Paul G. Begum, Salt Lake City; Mark A. Geiger, Draper, both of Utah

[73] Assignee: Klever-Marketing, Inc., Salt Lake City, Utah

[21] Appl. No.: 09/073,001

[22] Filed: May 5, 1998

[51] Int. Cl.[7] .................................. G09F 3/18; G09F 3/20
[52] U.S. Cl. ........................................... 40/661.03; 40/651
[58] Field of Search ........................ 40/649, 651, 661.03, 40/666

[56] References Cited

U.S. PATENT DOCUMENTS

| | | | |
|---|---|---|---|
| 3,015,897 | 1/1962 | Hopp | 40/651 X |
| 4,002,886 | 1/1977 | Sundelin | 235/61.7 |
| 4,143,847 | 3/1979 | Cross | 248/459 |
| 4,317,303 | 3/1982 | Sernovitz | 40/564 |
| 4,500,880 | 2/1985 | Gomersall et al. | 340/825.35 |
| 4,521,677 | 6/1985 | Sarwin | 235/385 |
| 4,603,495 | 8/1986 | Stevens | 40/451 |
| 4,805,331 | 2/1989 | Boggess et al. | 40/651 |
| 4,809,874 | 3/1989 | Pehr | 215/235 X |
| 4,881,707 | 11/1989 | Garfinkle | 40/661.03 X |
| 4,888,709 | 12/1989 | Revesz et al. | 634/518 |
| 4,909,464 | 3/1990 | Levine et al. | 40/661.03 X |
| 4,924,363 | 5/1990 | Kornelson | 362/125 |
| 4,962,466 | 10/1990 | Revesz et al. | 364/518 |
| 5,111,196 | 5/1992 | Hunt | 340/825.35 |
| 5,111,606 | 5/1992 | Reynolds | 40/642 |
| 5,233,773 | 8/1993 | Reynolds | 40/642 |
| 5,289,652 | 3/1994 | Kringel et al. | 40/651 |
| 5,703,564 | 12/1997 | Begum et al. | 340/539 |

*Primary Examiner*—Anthony Knight
*Assistant Examiner*—Marcus Dolce
*Attorney, Agent, or Firm*—Richard Esty Peterson

[57] ABSTRACT

A shelf mounted display sign designed in particular for supermarkets having product shelves with pricing tracks, the display sign having a mechanical shelf clip connected to a vertical battery canister that has a cap with indicator lights and a vertical sign bracket with a flexible sign having a side edge engaged in the vertical sign bracket, the shelf mounted display sign also including in one embodiment the electronic circuitry and components to function as a triggering device to remotely activate a product promotion or advertisement on a display or a shopping cart proximate the triggering device.

14 Claims, 2 Drawing Sheets

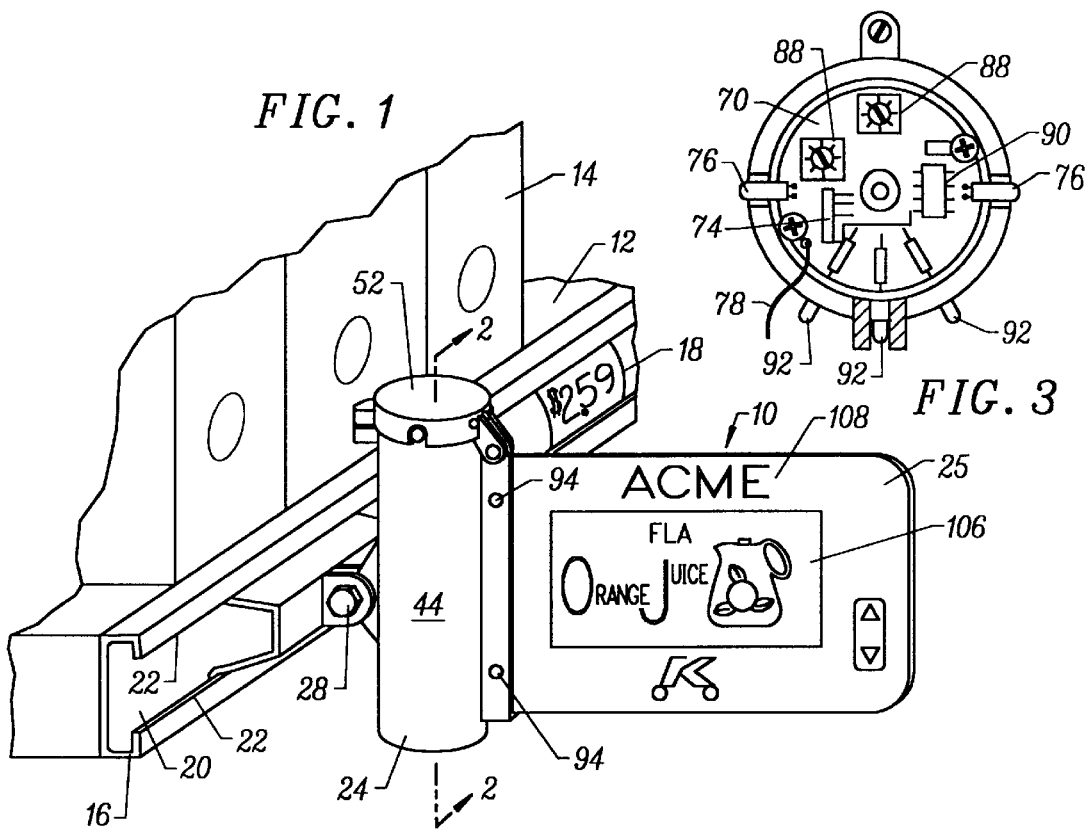
FIG. 1
FIG. 3
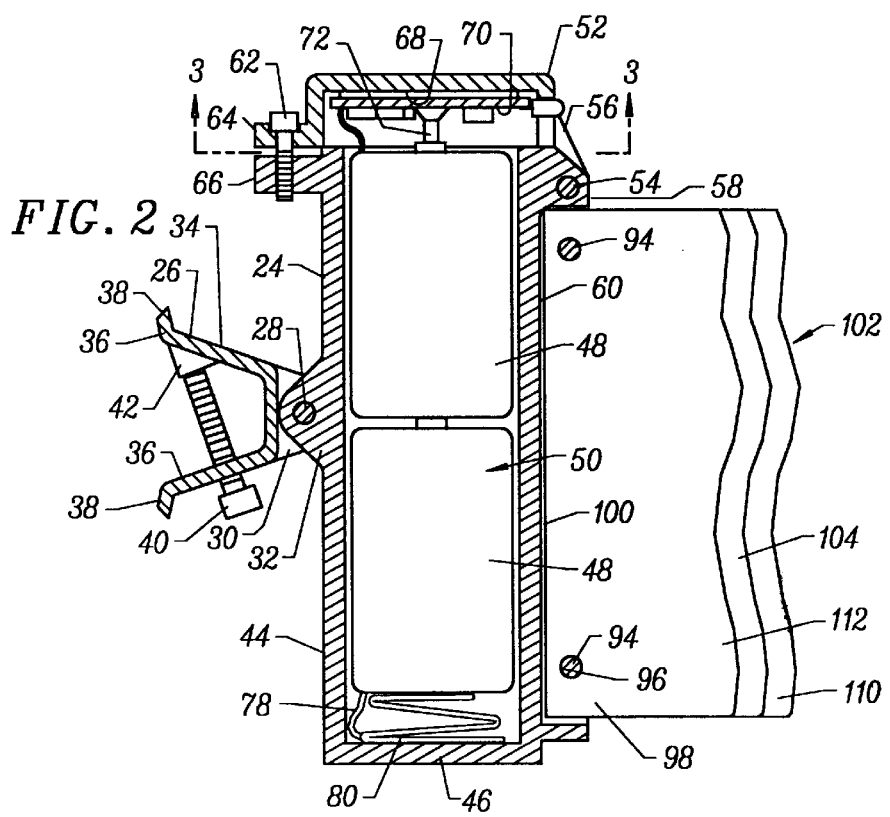
FIG. 2

TRIGGER UNIT FOR SHOPPING CART DISPLAY

BACKGROUND OF THE INVENTION

This invention relates to the field of retail marketing and in particular to an electronic, product promotional device. The product promotional device of this invention is a shelf-mounted display sign with a mechanical shelf clip connected to a vertical battery canister that has a bracket with a flexible flap that provides a signboard for an advertisement or product promotion. The canister includes one or more lights to attract a shopper's attention and preferably includes circuitry for the preferred embodiment as a trigger unit for a shopping cart display.

In stores where there is volume retail marketing, particularly supermarkets, product advertising and promotions inside the stores have proliferated. Because of the large number of available products, the use of available floor space is optimized by the installation of long shelf structures separated by aisles. Shoppers meander along the aisles with shopping carts and shopping baskets, stopping to peruse and select products. The aisles must therefore be wide enough to accommodate passing shoppers and carts, allowing room for shoppers to turn around and reverse direction.

For example, in the patent of Begum, U.S. Pat. No. 5,703,564, issued Dec. 30, 1997, a suspended advertising and promotional display is supported by a wand mounted to the top of a shelf unit in a store. The unit combines motion in a revolving cylindrical signboard with lights to attract a customer's attention.

In store advertising and product promotion must be tailored to the design and layout of the store without interfering with the ordinary traffic of shoppers and their carts or baskets. Space at the ends of the shelf structures are usually occupied by special product displays. Signboards and other marketing devices are often suspended from the ceiling, mounted on walls or positioned on top of the shelf structures.

The free standing shelf structures or gondolas, as they are known in the industry, frequently include a track along the front edge of each shelf for mounting price cards and product specific information. With most of the other available locations for product advertising and promotion utilized, marketing specialists have begun to mount advertising and promotional devices to the shelf track. To attract the shopper's attention, many of these devices project perpendicularly into the aisle space. Such devices include coupon dispensers, lighted signboards and other attention seeking marketing devices similar to the merchandising display of Reynolds in U.S. Pat. No. 5,111,606 issued, May 12, 1992. Because the displays project from the shelf track into the aisle space, such devices are subject to inadvertent contact by shoppers. In the referenced patent, a signboard or advertising card is contained in a rigid frame on which are mounted perimeter lights. The frame has a resilient tab that is connected to a track mount. The track mount contains a battery to provide power supply to the lights on the frame. Since display cards are inserted through a slot on the tab side of the frame, the device must be removed from the shelf when changing cards. Additionally, the use of a flexible tab with internal wires provides a weak link in the structure that may be subject to failure or result in fatigue breakage of the wires. Furthermore, the rigid frame may appear more imposing to shoppers, creating an apprehension that they may damage the structure if inadvertently contacted, since the flexible connection is hidden from view. Finally, the complexity of the display adds unnecessary expense to what is a relatively simple advertising device where a number of such devices may be strategically dispensed throughout the retail establishment.

These and other deficiencies in the prior art devices inspired the simple display device of this invention, which can be utilized as a simple signboard display, or a combination signboard display and triggering unit for a shopping cart display as described in the specification that follows.

SUMMARY OF THE INVENTION

The shelf-mounted display sign of this invention comprises an inexpensive electronic display device that is primarily designed to be mountable to a conventional pricing track of a supermarket product shelf. The display sign is constructed with a mounting clip connectable to the pricing track. The mounting clip is pivotally connected to a vertically oriented, cylindrical canister. The pivotal connection permits the canister to be vertically positioned where a shelf-track is tilted for easier viewing of price cards positioned along the track. The canister is preferably sized to contain two ordinary size C or D batteries which power a pair of indicator lights mounted in a cap on the top of the canister. In the preferred embodiment, the cap also contains one or more infrared lights and control circuitry to emit a code signal to proximate shopping cart displays as described in Begum, U.S. Pat. No. 5,703,564.

On the opposite side of the canister from the mounting clip, the canister has an elongated rail with a longitudinal slot for anchoring one edge of a flexible signboard. The edge of the signboard is inserted into the slot and secured by two cross pins or rivets. Preferably the signboard is a paper or thin cardboard sheet printed on both sides and laminated on both sides with clear plastic. This construction results in the signboard being flexible and bendable, but fold resistant. In this manner, a shopper or shelf clerk contacting the signboard projecting horizontally from the shelf will simply displace the flag-like projection. The signboard will return its original position after contact. Because of the simplicity in construction, the signboard can be easily replaced with a substitute signboard promoting the same or different product in keeping with the marketing program of the store manager.

Preferably the cap is hinged to the top of the bracket and includes a clamping screw to secure the top cap to the canister and discourage tampering. Also, the mounting clip has a similar clamping screw to secure the clip to the pricing track preventing displacement of the clip in the track. By modification of the mounting clip, the electronic display device can be mounted to the ends of a product gondola, a store wall, store appliances, and at other locations that advantageously display the signboard.

The display sign of this invention is designed to be inexpensively constructed with the important feature of inexpensive fabrication and easy replacement of the signboard. In use as a triggering unit the display sign serves the dual function of an electronic advertising or product promotion display device, and a signal station for a shopping cart display system having stored product related graphics that are displayed on a display screen on the cart when the cart is proximate the trigger unit.

These and other features will become apparent from a detailed description of the preferred embodiment that follows.

BRIEF DESCRIPTION OF THE DRAWINGS

FIG. 1 Is a perspective view of the shelf mounted display sign mounted to a typical store shelf.

FIG. 2 Is a cross-sectional view of the shelf mounted display sign of FIG. 1 taken on the lines 22 in FIG. 1.

FIG. 3 Is a underside view of a cap on the display sign of FIG. 2 taken on the lines 33 in FIG. 2.

DETAILED DESCRIPTION OF THE PREFERRED EMBODIMENT

Figure 4:
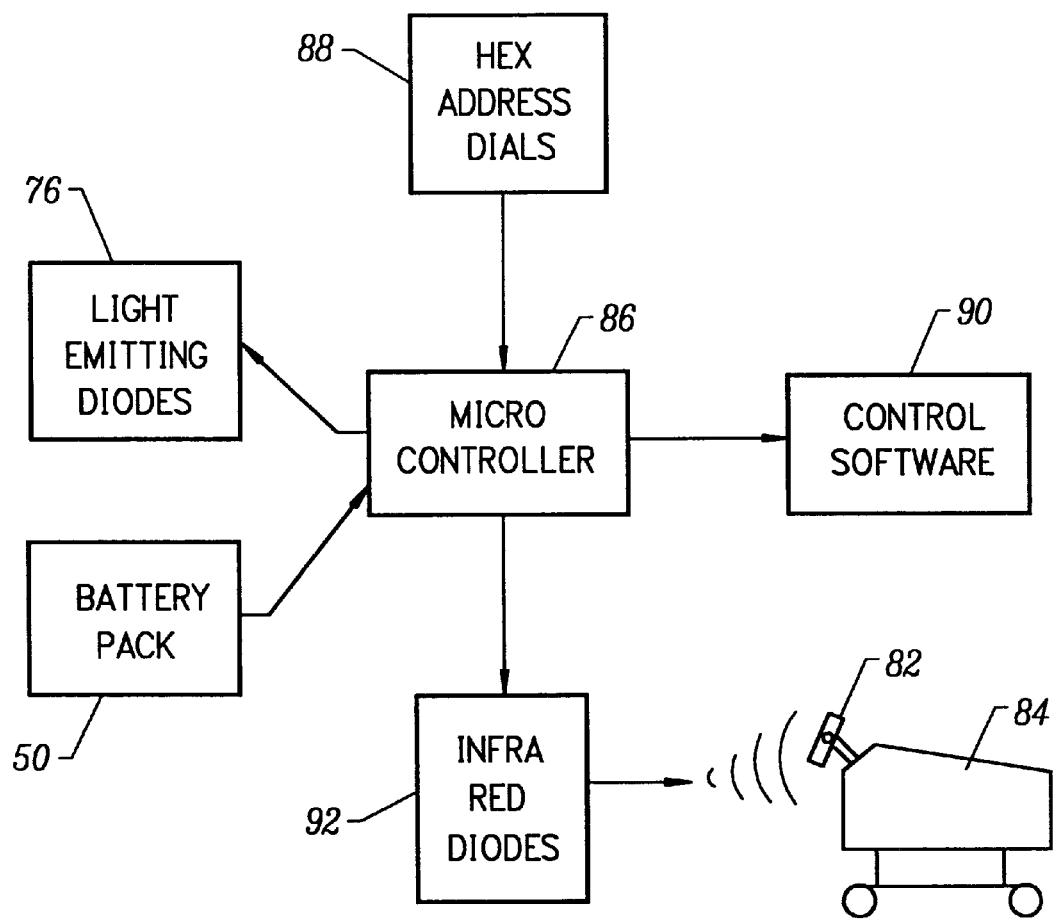
FIG. 4 Is a blocked diagram of the electronic circuitry for the display sign of FIG. 1.

Referring to FIG. 1, a shelf-mounted display sign, designated generally by the reference numeral 10, is shown mounted to a typical store shelf 12 on which goods 14 are displayed for purchase by customers. As is customary in grocery stores, supermarkets and other retail establishments where customers collect items from the shelf for purchase, the shelf 12 includes a pricing rail 16 to which pricing cards are inserted to indicate the price of the product sold or other information of interest to the customer. A typical price card 18 is shown installed into the pricing track 16 shown in FIG. 1. The pricing track 16 provides a convenient mount to support advertising devices of the type described in this specification. The pricing track 16 typically is a metal extrusion having a recessed portion 20 with a pair of bracket elements 22 that retain the price card 18 in the pricing track 16.

Referring to FIGS. 1 and 2, the shelf-mounted display sign 10 has a canister unit 24 connected to a mounting clamp 26 by a pivot pin 28. The pivot pin 28 is a clamping bolt that couples a pair of bracket members 30 on the clamping mount with a projecting tab 32 on the canister unit 24. The mounting clamp 26 has an elongated engagement member 34 with a pair of flexible prong elements 36 with ends 38 that installed behind the bracket elements 22 of the pricing track 16. A bolt 40 threaded through one of the prong elements 36 engages a stop 42 and spreads the prong elements 36 to lock the mounting clamp 26 to the pricing track 16. The bolt 28 comprising the pivot pin interconnecting the mounting clamp 26 with the canister unit 24 allows the canister unit 24 to be positioned with respect to the mounting clamp 26 to orient the canister unit 24 vertically with respect to the horizontal pricing track 16. It is to be understood that for certain market shelves, the pricing track 16 may be mounted at an incline to improve the viewing angle of the track and installed pricing cards 18. The mounting clamp 26 can be modified to provide a mount for the display sign when mounting to structure other than a pricing track. For example, a flat wall plate can be substituted for the prong elements for mounting to a flat surface.

The canister unit 24 has an elongated cylindrical body 44 with a closed bottom 46 for containing a pair of batteries 48 that form a battery pack 50 for powering the electronics of the display sign. The batteries are preferably D cells, but may comprise other sizes according to the power requirements and the aesthetic design of the canister unit desired.

The canister unit 24 also includes a cap 52 at the top of the unit. The cap 52 is hinged to the cylindrical body 44 of the canister unit 24 by a pivot bolt 54 that engages a pair of depending bracket elements 56 on the cap 52 and the top segment 58 of a slotted rail 60. The hinged cap 52 is secured to the canister unit 24 by a bolt 62 through a hole in a projecting tab 64 on the cap 52 that engages a complimentary threaded hole in a tab 66 on the canister unit 24. Preferably, all bolts are hex-socket, machine screws that have a knurled head for finger tightening when adjusting, but reduce tampering when tightened with a hex key.

The cap 52 has a recess 68 for receiving a circuit board 70 shown in FIG. 3 which includes a projecting battery contact 72 and the necessary circuitry 74 connecting a pair of indicator lights 76 to a power source. The indicator lights 76 are preferably red, light emitting diodes that flash to attract a customer's attention. The circuitry 74 includes a wire lead 78 that runs to the bottom 46 of the canister unit 24 to connect to a conductive coil spring 80 that in conjunction with the battery contact 72 provides the power leads to the lights 76. The circuitry includes a conventional time delay capacitor circuit to cause the periodic flashing that is preferred. In the preferred embodiment the shelf-mounted display sign 10 includes additional circuitry to enable the display sign to function as a triggering unit to activate the display 82 of a product advertisement or product promotion on a shopping cart 84 as schematically illustrated in FIG. 4. The circuitry 74 therefore includes a micro-controller 86 that receives a code input from a pair of hex address dials 88 shown mounted on the circuit board 70 in FIG. 3. The micro-controller 86 accesses a control program in a read only memory chip 90 and processes the code and data to generate an output signal, here a group of infra-red diodes 92 directed to the aisle area in front of the display sign 10. It is to be understood that in the dual capacity as a combination display sign and triggering unit, the circuitry, with modification can generate other types of codes transmissions such as radio frequency or ultrasonic transmissions. In general, the coded transmissions must be localized in nature to preferably effect activation of the promotion or advertising only on shopping carts proximate the unit.

Because it is expected that the signboard 25 of the display sign is frequently changed, the signboard 25 can be changed or replaced without removing the unit from the shelf. The slotted rail 60 has two plastic rivets 94 sized for press fitting into two spaced holes (not visible) in the rail 60. The rivets 94 pass through two complimentary holes 96 in the side edge 98 of the signboard 25 and lock the signboard 25 in the slot 100 of the slotted rail 60. The rivets are easily pushed out and after removal and installation of a substitute signboard 25, reinstalled locking the new signboard in the rail 60.

The signboard 25 is preferably a flexible three-ply sheet 102 with a paper sheet 104 printed with graphics 106 and text 108 on both sides, sandwiched between two clear plastic sheets 110 and 112. In this manner the resulting laminated sheet is waterproof, soil resistant and flexible allowing the signboard to be bent or deflected without folding or creasing. The signboard is easily fabricated using a color printer and a conventional laminating kit. Although the graphics 106 and text 108 may correspond to the promotion or advertising activated on the display 82 of the shopping cart 84, this is not required.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A shelf-mounted display sign for a store shelf having a horizontal pricing track comprising:

a mounting bracket having a mounting member connectable to the horizontal pricing track of the store shelf;

an elongated battery canister connected to the mounting bracket with the elongated battery canister having a top and a longitudinal axis, wherein the axis is oriented substantially perpendicular to the horizontal pricing track when the mounting member is connected to the pricing track;

a canister cap connected to the top of the canister, the canister cap having at least one indicator light;

a battery pack containable in the battery canister, the canister and cap having an electronic circuit electrically connecting the indicator light and battery pack, and lighting the indicator light;

a fixed, vertically oriented signboard bracket on the canister; and, a frameless, flexible signboard having side edges with a single side edge engageable with the signboard bracket wherein the side edge is vertically oriented along the longitudinal axis of the canister.

2. The shelf-mounted display sign of claim 1 wherein the canister cap includes electronic circuitry and at least one signal transmitter element for activating a display advertisement on a shopping cart display.

3. The shelf-mounted display sign of claim 2 wherein the transmitter element comprises an infra red diode.

4. The shelf-mounted display sign of claim 1 wherein the mounting member of the mounting bracket has a pivot member wherein the canister is connected to the pivot member and vertically positionable on an incline pricing track.

5. The shelf-mounted display sign of claim 1 wherein the mounting bracket has a threaded adjustment bolt for securing the mounting member to the pricing track.

6. A shelf-mounted display sign for a product shelf having a horizontal pricing track comprising:

an elongated battery container having a longitudinal axis;

means for attaching the battery container to the pricing track with the longitudinal axis of the battery container vertically oriented;

at least one indicator light, the battery container having a top with means for mounting the indicator light on the top of the battery container for viewing by persons near the shelf-mounted display sign;

a battery means in the battery container for powering the indicator light;

a frameless and flexible signboard having side edges and;

means fixed to the battery container for fixedly securing a single side edge of the signboard to the battery container with the side edge being aligned with the longitudinal axis of the battery container.

7. The shelf-mounted display sign of claim 6 wherein the signboard comprises a plastic laminated paper sheet having product marking indicia.

8. The shelf-mounted display sign of claim 7 wherein the battery container includes signal emission means for triggering the display of product information on a shopping cart display displaced from the display sign.

9. The shelf-mounted display sign of claim 8 wherein the top of the battery container comprises a cap, the cap being hingedly connected to the container.

10. The shelf-mounted display sign of claim 9 wherein the cap includes circuit means connected to the battery means for powering the signal emission means.

11. A display sign for mounting to a support structure in a store near products for sale comprising:

a mounting bracket having a mounting means connectable to a support structure in a store for mounting the display sign near products for sale;

an elongated battery canister connected to the mounting bracket with the elongated battery canister having a top and a longitudinal axis, wherein the axis is oriented substantially perpendicular when the mounting member is connected to the support structure;

a canister cap connected to the top of the canister, the canister cap having at least one indicator light;

a battery pack containable in the battery canister, the canister and cap having an electronic circuit electrically connecting the indicator light and battery pack, and lighting the indicator light;

a fixed, vertically oriented signboard bracket on the canister; and, a frameless, flexible signboard made of a bendable material having side edges with a single side edge connected to the signboard bracket wherein the side edge is vertically oriented along the longitudinal axis of the canister.

12. The shelf-mounted display sign of claim 1 wherein the signboard comprises a laminated sheet.

13. The shelf-mounted display sign of claim 6 wherein the signboard comprises a laminated sheet.

14. The display sign of claim 11 wherein the signboard comprises a laminated sheet.

* * * * *